— RE-ISSUE —
DUNHAM AND WIDNEY'S HEAD AND SHOE FOR CAR-BRAKES —
REISSUED JUL 11 1871
4466
- FIG. 1. -
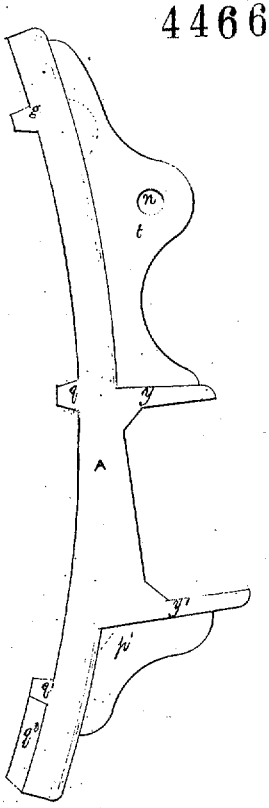
- FIG. 2. -
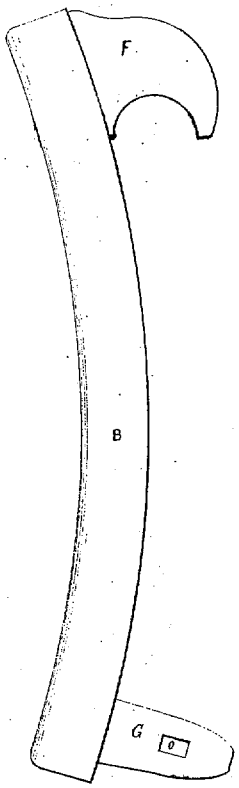
- FIG. 3. -
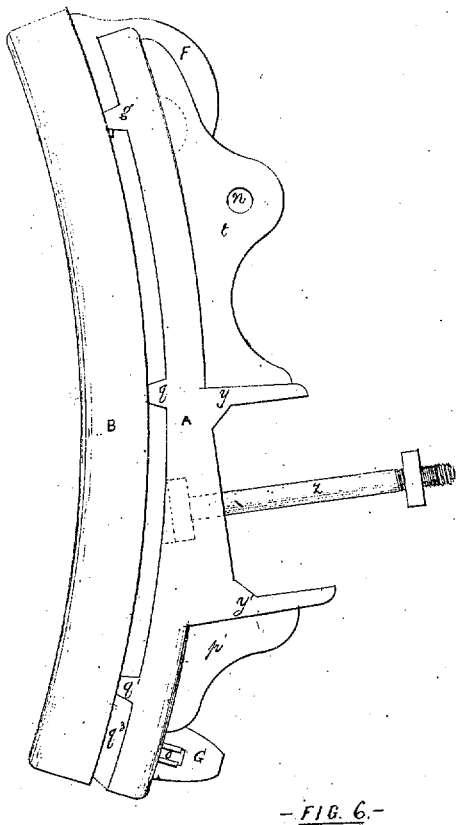
- FIG. 4. -
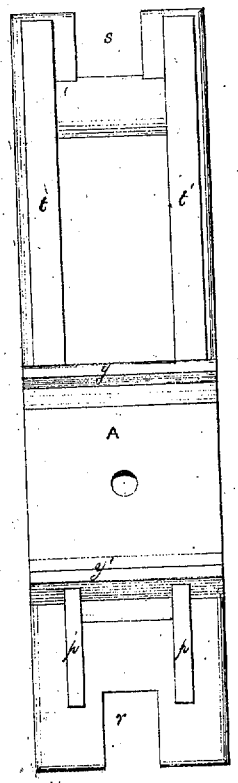
- FIG. 5. -
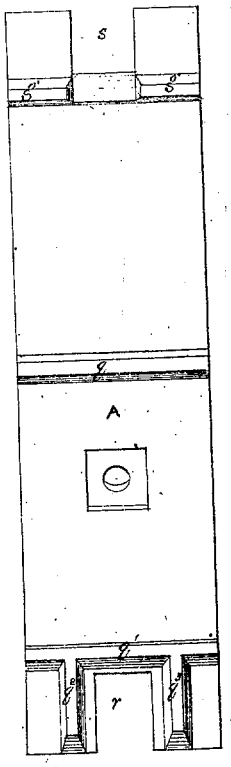
- FIG. 6. -
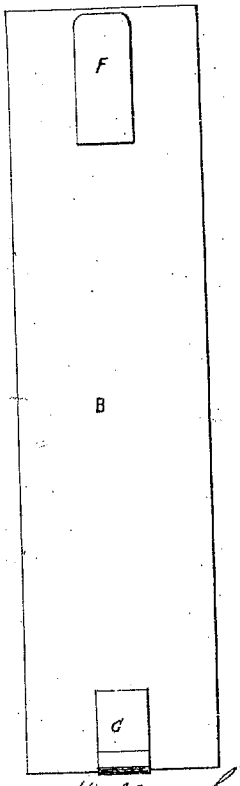
WITNESSES —
John H. Edmunds
J. H. Whitt
— INVENTORS —
William H. Dunham
James Widney
per S. A. Ross
Samuel P. Ross

UNITED STATES PATENT OFFICE.

WILLIAM H. DUNHAM, OF HOKAH, MINNESOTA, AND JAMES WIDNEY, OF ALLEGHENY, ASSIGNORS OF PART INTEREST TO SAMUEL P. ROSS, OF PITTSBURG, PENNSYLVANIA.

IMPROVEMENT IN CAR-BRAKE SHOES.

Specification forming part of Letters Patent No. 71,591, dated December 3, 1867; reissue No. 4,466, dated July 11, 1871.

DIVISION B.

*To all whom it may concern:*

Be it known that we, WILLIAM H. DUNHAM and JAMES WIDNEY, the former now of Hokah, State of Minnesota, the latter of the city of Allegheny and State of Pennsylvania, have invented a certain Improvement in Car-Brakes; and having assigned a portion of our interest in the same to SAMUEL P. ROSS, of the city of Pittsburg and State of Pennsylvania aforesaid, the following is a specification:

The invention consists in a new and improved brake-head and brake-shoe, to be attached to locomotives and car-trucks, the novelty and utility of which are in the mode of fastening them together by means of a hook and a lug on the brake-shoe fitting into slots or apertures in the brake-head, thereby firmly holding them together and greatly facilitating the removal of worn-out brake-shoes and the replacing of new ones.

The accompanying drawing represents the machine in separate parts and when put together. Figure 1 is a side view of the brake-head. Fig. 2 is a side view of the brake-shoe. Fig. 3 is a side view of the brake-head and brake-shoe fastened together. Fig. 4 is a back view of the brake-head. Fig. 5 is a front view of the same. Fig. 6 is a back view of the brake-shoe.

A represents a casting, usually called a "brake-head," curved on its face to suit the curvature of the car-wheel. Upon the back of the brake-head are placed two transverse flanges, *y y'*, for the purpose of holding between them firmly the brake-beam. Reaching from the flange *y* to the upper end of the brake-head are two other flanges running lengthwise, with a hole, *n*, in them, through which, by means of a stirrup, the brake-head and brake-beam are suspended from the car-truck. Running transversely to the curved face of the brake-head A are jogs or ribs *q q q'*, for the purpose of keeping the brake-head A and the brake-shoe B apart, forming air-spaces, and thereby preventing heating. The brake-shoe B is also a casting, conforming in length, width, and curvature to the brake-head A, and of whatever thickness may be deemed proper. It has at the upper end the hook F and at the lower end the lug G, which last is furnished with the key-slot O. The hook F is made to drop into the slot S in the upper end of the brake-head A, and the lug G is made to pass through the slot E in the lower end of the same. A key passed through the key-slot O secures the whole together.

We claim—

The brake-shoe B, formed with the hook F and the lug G, the hook having a bearing in the slot S on the upper end of the brake-head, and the lug passing through the slot E in the lower end of the same and secured by a key, all constructed and arranged substantially as and for the purpose set forth.

JAMES WIDNEY.
S. P. ROSS.
W. H. DUNHAM.

Witnesses:
WILLIAM F. ROBB,
GEORGE OGDEN,
JAMES E. ANDERSON,
L. S. KEELER.